Aug. 25, 1970   J. C. DUDDY   3,525,645
SILVER CHLORIDE BATTERY AND METHOD OF OPERATING SAME
Filed June 20, 1968

United States Patent Office 3,525,645
Patented Aug. 25, 1970

3,525,645
SILVER CHLORIDE BATTERY AND METHOD OF OPERATING SAME
Joseph C. Duddy, Trevose, Pa., assignor to ESB Incorporated, a corporation of Delaware
Filed June 20, 1968, Ser. No. 738,671
Int. Cl. H01m 17/00, 27/00
U.S. Cl. 136—86        8 Claims

ABSTRACT OF THE DISCLOSURE

An electric battery having a positive electrode comprising silver chloride on a porous, high surface area silver gas electrode, a saline solution such as sea water as an electrolyte, and a negative electrode of zinc or magnesium. The silver gas electrode has a hollow interior into which chlorine gas is supplied under pressure. The chlorine and the porous silver electrode react to produce silver chloride in-situ at a rate determined by the rate of discharge of the battery. Means are provided to enable sea water to flow into the battery to replenish the electrolyte as well as to enable the electrolyte already within the battery to be purged so as to prevent too large a concentration of zinc chloride to accumulate in the battery.

BACKGROUND OF THE INVENTION

Sea water batteries generally comprise positive electrodes of silver chloride and negative electrodes of zinc, magnesium or alloys based on these metals. Conventional silver chloride electrodes are usually made by casting and rolling sheets of silver chloride, by pasting suitable grids with a paste of powdered silver chloride, or by plating silver chloride onto silver grids from aqueous solutions containing chloride ions. During discharge these electrodes all function in the same manner with the reduction of silver chloride to metallic silver. Batteries of this type cease to function when the supply of silver chloride is exhausted and generally are characterized by a short life and a relatively high rate of discharge. The characteristic voltage of such batteries is that of the couple formed by the silver chloride and the metal used as the negative electrode in sea water.

Chlorine depolarized primary batteries are also known in the art. This type of battery generally consists of a positive electrode of porous carbon depolarized with chlorine, a negative electrode of magnesium, zinc or an alloy based on these metals and an electrolyte comprising an immobilized aqueous solution of a halogen salt. Batteries of this type have a voltage characterized by the couple formed by chlorine and the metal of the negative electrode in the particular electrolyte utilized.

SUMMARY OF THE INVENTION

It is an object of the present invention to provide a new and improved silver chloride electrode in which the silver chloride is continuously produced in-situ according to demand.

It is another object of the present invention to provide an electrode with a depolarizer thereon which has a potential characterized by the reaction product of chlorine and the metallic substrate of the electrode.

It is a further object of the present invention to provide a new and improved sea water battery characterized by a long life and the ability to be discharged at high rates.

A still further object of the present invention is to provide a sea water battery characterized by a low cost and a high energy density.

The foregoing objects are accomplished by a system which is basically a silver chloride-zinc or silver chloride-magnesium cell in which silver chloride is produced continuously, according to demand, by the in-situ reaction of chlorine gas on a high surface area silver gas electrode. Because the reaction product of the negative electrode is either zinc chloride or magnesium chloride which are extremely soluble in the electrolyte, there is essentially no polarization even at high rates and the electrical losses in the cell are almost entirely ohmic. Sea water is the preferred electrolyte and if its circulation is limited, its conductivity will increase during discharge due to the accumulation of the soluble negative electrode reaction product. The battery of the present invention will function as long as the reactants, chlorine and the negative electrode metal, are available. Although chlorine gas is fed into the battery of this invention in a manner similar to chlorine depolarized batteries, the gas in this instance is not the depolarizer but rather it reacts with the porous silver electrode to form a positive electrode comprising a silver chloride depolarizer on a porous silver substrate. Thus a silver chloride battery is provided with the novel feature that the positive active material, silver chloride, is continuously produced within the battery in accordance with the load demand of the external circuit and at the same rate as silver chloride is reduced to metallic silver.

DESCRIPTION OF THE PREFERRED EMBODIMENT

Figure 1:
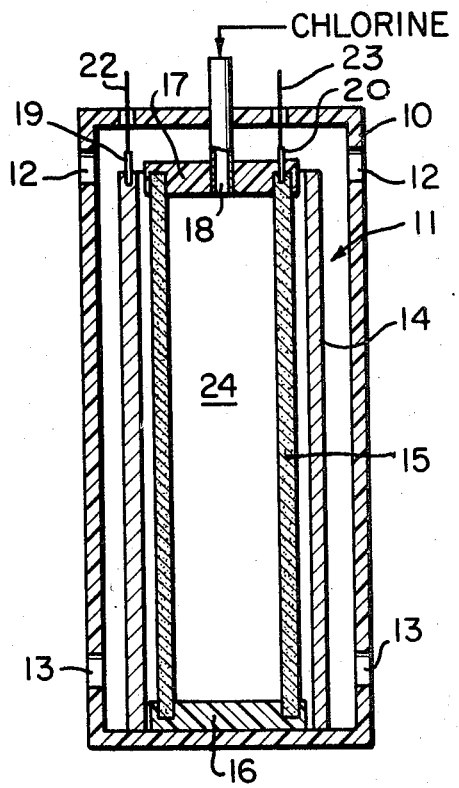
FIG. 1 is a sectional elevation of one embodiment of a battery made in accordance with the present invention; and, FIG. 2 is a graph showing the performance of a battery of the type shown in FIG. 1 illustrating the effect of the presence of reaction products in the cell electrolyte.

Referring now to FIG. 1, the numeral 10 designates a housing enclosing a battery 11 embodying the features of the present invention. The housing 10 is adapted for immersion in sea water and is provided with a plurality of upper electrolyte ports 12 and lower ports 13 to allow the circulation of sea water, which is the preferred electrolyte, through the battery 11. The housing is preferably made of plexiglass, although any non-conductive, impermeable material such as polyvinyl chloride or rubber is suitable. The battery 11 comprises a negative electrode 14 of metallic zinc and a positive electrode of porous silver 15. The electrodes 14 and 15 preferably are cylindrical and are mounted concentrically with respect to each other and are spaced from each other. If the electrodes were located about $\frac{1}{32}$ inch or less from each other so that the chance of coming into contact is greatly increased, then it would be necessary to insert spacers or separators between the electrodes. Microporous polyvinyl chloride would be a suitable material for these separators.

The electrode 15 of porous silver is a gas electrode having a bottom cap 16 and a top cap 17. The top cap 17 of the electrode 15 is provided with a gas inlet tube 18 extending through the top of the housing 10 and adapted to be connected to a source of chlorine gas. The electrode 14 has a terminal 19 and the electrode 15 has a terminal 20, to which are connected leads 22 and 23 respectively for connection to the external load.

These caps can be made of epoxy or any plastic which is inert with respect to chlorine and can simultaneously serve the several purposes of insulating the electrodes from each other, of giving structural rigidity to the cell and of sealing the chlorine gas under pressure in the interior 24 of the silver electrode 15. Alternatively, the silver electrode 15 could be sealed at each end by means of a silver nut or by welding the ends closed with silver.

With the use of either of the latter methods the terminal 20 could be eliminated and the gas inlet tube 18 could be made of silver and serve as the terminal for the silver electrode 15. The electrodes also would have to be insulated from each other.

The electrode 15 may be a porous silver gas electrode of the type conventionally used in fuel cells. Preferably, the electrode 15 is made of sintered silver to insure adequate mechanical strength. Such a sintered silver electrode may be manufactured by means of the process described in my U.S. Pat. No. 3,266,893, issued Aug. 16, 1966. In accordance with that patent, a first insoluble thermoplastic resin is intimately mixed under heat and pressure with a second thermoplastic resin, which is substantially insoluble in the first thermoplastic resin, to produce a plasticized mass. A powdered sinterable material such as silver or mixtures of silver and nickel is then added to the plasticized mass and the resulting mixture is shaped by calendering or extrusion into electrode form which will be subsequently structurized by sintering. Prior to the sintering operation the soluble thermoplastic is removed from the shaped form leaving the form to be sintered porous. The shaped porous electrode form is then incrementally heated to remove the insoluble thermoplastic resin and to sinter the shaped porous metallic residue. In the practice of this invention an additional step is performed wherein the nickel, which is present as a mixture with silver, is removed from the shaped form after sintering. The nickel may be removed, for example, by placing the shaped sintered form in a warm bath of hydrochloric acid. Due to the removal of the nickel, the final product is a sintered silver electrode of even higher porosity than that obtained in my U.S. Pat. No. 3,266,893. Other methods of providing a porous, sintered silver electrode can be used, it being important to this invention that the silver be porous with a reasonably high surface area.

The electrode 14 preferably is formed from a sheet of massive metallic zinc. Alternatively, magnesium may be substituted for the zinc as the negative electrode, however it would be necessary to employ suitable separators between the electrodes in order to be certain that the chlorine gas be kept separate from the hydrogen gas which is evolved when the magnesium electrode contacts the sea water.

Before the porous silver electrode is ready to be used in a battery of this invention, it is first "conditioned" either prior to being assembled in the battery or in the battery itself. This conditioning process involves immersing the porous electrode in brine of sea water composition and introducing chlorine gas at a low pressure into the porous silver network. The larger electrode pores and defective areas, if any, initially pass the gas freely but soon become occluded due to the formation of silver chloride so that an equilibrium is reached and gas leakage stops. Subsequently, the gas pressure is increased in stepwise manner passing through a series of equilibrium stages as substantially all the pores of the silver electrode become filled with silver chloride. Eventually, at a pressure of about 15 pounds per square inch, the outer surfaces of the electrode darken to the color of silver chloride and all leakage stops. At this point the electrode is considered to be "conditioned" and ready for use in either the wet or the dry state.

In operation, the battery of FIG. 1 is a zinc-silver chloride battery with the silver chloride being continuously produced according to demand by an in-situ reaction in the sea water electrolyte between chlorine gas and the high surface area of the porous silver electrode 15. As the battery is discharged, the silver chloride, which is present throughout the porous network of the conditioned silver electrode, is reduced to silver. The sea water electrolyte is also present in the porous network, having entered the battery through the ports 12 and 13 of the housing 10. The chlorine gas is supplied through inlet tube 18 into the interior area 24 of the silver electrode 15 at a pressure of about 7–8 pounds per square inch and dissolves in the sea water, reacting with available silver to form silver chloride in-situ.

Since the silver electrode has previously been "conditioned" it will have a reserve of silver chloride already present. As an indication of the amount of this silver chloride reserve that can be expected to be found, a fully conditioned tubular electrode of 1⅛ inch outside diameter with $\frac{1}{16}$ inch wall thickness will have a reserve of about 1.25 ampere hour per inch of length. During operation this reserve decreases, in gradient fashion, from the outer surface of the electrode inward until an equilibrium is reached, whereupon new silver chloride is continuously formed from silver and chlorine at a rate which satisfies the discharge conditions. Thus at a fixed rate of discharge an equilibrium is achieved wherein the rate of formation of silver chloride equals the rate of reduction of silver chloride to metallic silver. The rate of formation of the silver chloride therefore varies in proportion with the circuit load and proceeds at a rate sufficient to supply the proper current. The overall electrochemical reaction results in a discharge product of zinc chloride which is very soluble in the sea water. Since the zinc chloride solution is heavy it will tend to concentrate in the bottom of the battery and can gradually flush out through the ports 13 at a rate whereby an electrolyte of rather constant specific gravity and conductivity will be maintained within the battery.

Consideration of the operating characteristics as outlined above indicates the important advantages presented by a battery of this invention over prior art batteries. Some of these advantages include the facts: that the battery will function as long as the reactants, zinc metal and gaseous chlorine are available; that due to the high degree of solubility of the reaction product, $ZnCl_2$, in the sea water comparatively little electrolyte is required and there is essentially no polarization even at high rates, the internal losses being entirely ohmic in nature; that the accumulation of $ZnCl_2$ will increase the conductivity of the sea water electrolyte; and that due to the use of chlorine gas no bacterial organisms will be able to grow in the battery and therefore "fouling" of the cell is not possible over long term operation.

EXAMPLE 1

A battery was constructed in accordance with the teaching of this invention to form a silver chloride-zinc sea water battery. The porous, sintered silver substrate of the positive electrode was made following the procedure of my U.S. Pat. No. 3,266,893 as outlined elsewhere in this disclosure including the additional step of removing the nickel from the shaped electrode form after sintering. The electrode formulation used in this process had the following constituents present:

| | Parts by wt. |
|---|---|
| Polyethylene | 1 |
| Polyethylene oxide | .85 |
| Silver | 13 |
| Nickel | 2.2 |

The nickel was removed from the shaped electrode form after sintering by placing the form in a warm bath of hydrochloric acid. The porous silver electrode was a tube 8 inches long, 1⅛ inches in outside diameter with a ⅛ inch wall thickness. The top and bottom of the electrode were welded closed with silver. Chlorine gas was fed into the center of the tubular electrode through a ¼ inch silver tube which passed through the silver weld at the top of the electrode.

The zinc electrode was a tube 8 inches long with a $1\frac{3}{16}$ inch inside diameter and a .015 inch thick wall. The electrode was made from a flat zinc sheet which was rolled on a mandrel and spot welded to form a tube.

When the battery was assembled for operation, the electrodes were spaced 1/32 inch apart with microporous polyvinyl chloride wrapped around the silver electrode to serve as a separator. A battery having electrodes of the above dimensions with the polyvinyl chloride separator therebetween was tested with a sea water electrolyte of 1.027 specific gravity. In a second series of tests the zinc chloride was permitted to accumulate in the sea water electrolyte until a specific gravity of 1.110 was reached at which point data was then taken. In none of the tests was the electrolyte circulated throughout the battery system. The batteries were tested at room temperature. Representative curves of the data obtained from these tests are shown in FIG. 2.

Figure 2:
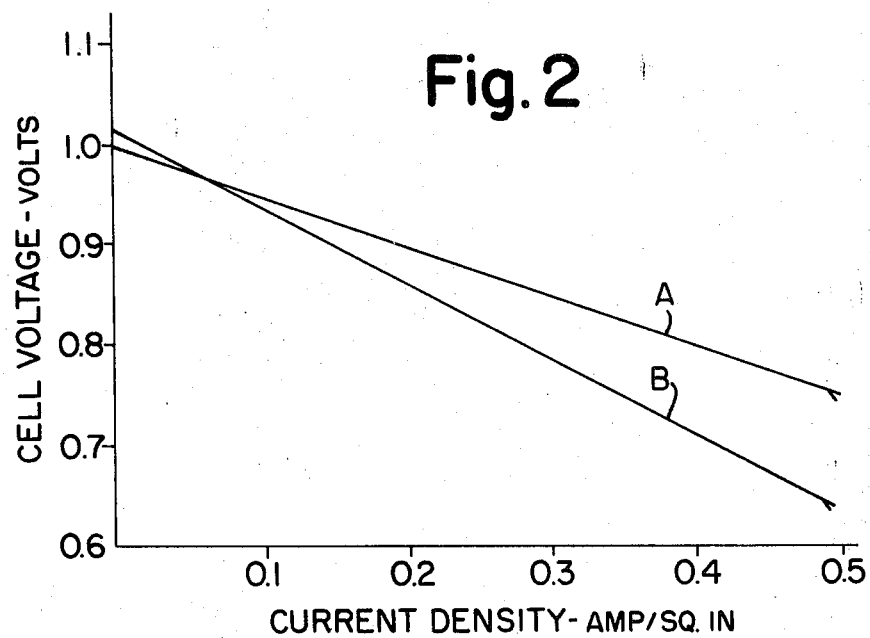

Referring to FIG. 2 there is shown a graph which illustrates the operating characteristics of the batteries described in Example 1. Curve A corresponds to a battery wherein the electrolyte is not changed and has a specific gravity of 1.110 due to the dissolution of the discharge product, zinc chloride, in the sea water electrolyte. Curve B corresponds to a battery of this invention having a fresh supply of sea water before there has been any appreciable dissolution of zinc chloride in the electrolyte so that its specific gravity is about 1.027. The operating characteristics of a battery are temperature dependent, but since the battery of this invention will normally be placed in the sea which is an excellent heat sink so that the battery will operate essentially at the temperature of the surrounding sea, it is satisfactory to test the battery at room temperature to determine the operating characteristics which can be expected at other temperatures.

As seen in FIG. 2 a battery having a fresh sea water electrolyte (Curve B) initially has a higher potential than the battery which has zinc chloride dissolved therein. However, at higher current densities, the battery having zinc chloride dissolved in the electrolyte (Curve A) has a higher average potential. While an accurate explanation of this phenomeon is not presently available, it is believed that it is possibly due to the fact that initially there is a greater solubility of the chlorine gas in the fresh electrolyte which causes the higher electrode potential at low current densities. At higher current densities however, the accumulation of zinc chloride in the electrolyte increases the latter's conductivity so that there is less ohmic loss in the electrolyte and the battery voltage is greater than that of the battery with fresh electrolyte. As a result the battery characterized by Curve A has a greater power output than a battery characterized by Curve B.

Since batteries made in accordance with this invention are well adapted for use in sonobuoy and other maritime uses, it is apparent that the curves of FIG. 2 are accurate in form although the value of the particular parameters can change as a result of environmenetal and other practical considerations such as variations in electrolyte density. Thus, referring to FIG. 1, the size of the ports 12 and 13 in the housing 10 and such circumstances as whether the battery is placed in rough or calm waters or if there are varying sea currents will determine the amount of sea water which enters the battery and the amount of electrolyte already in the battery which drains out of the battery. As a result, the quantity of zinc chloride present in the electrolyte can vary under such changing conditions so that the specific gravity and conductivity of the electrolyte will be slightly different under different environmental circumstances. This of course is no problem to the actual operation of the battery and it is desirable that the electrolyte be replenished and that the quantity of zinc chloride in the battery not become so great as to inhibit the dissolution of zinc in the electrolyte. As noted previously, the zinc chloride will tend to concentrate in the bottom of the battery so that there will be a stratification effect on the electrolyte whereby the electrolyte in the bottom of the battery will be of higher specific gravity than the electrolyte in the upper portion of the battery. Properly designed ports 12 and 13 will greatly aid in maintaining an electrolyte of relatively consistent specific gravity and conductivity by controlling both the amount of zinc chloride which is flushed out through the lower ports and by controlling the amount of fresh sea water entering through the upper ports.

Although a description of the preferred construction of a battery of this invention has been given, it is not intended to limit the invention to the particular device disclosed, since it will be obvious to those skilled in the art to utilize the teaching of this invention in developing and modifying batteries of the type disclosed here. Modifications that are readily apparent include having the negative electrode inside the positive silver electrode. The device was described and referred to as a sea water battery, however it is to be understood that electrolytes other than sea water may be used to carry out the reaction between the porous silver electrode and the chlorine gas. Thus, ammonium chloride, saline solutions and other chloride ion bearing electrolytes can be used in the battery of this invention. Also, as noted previously, magnesium can be used as the negative electrode and in this way higher voltages could be obtained. If the battery is not to be used for marine purposes, then the housing need not be equipped with the ports. It is seen therefore that this invention teaches a method of forming a silver chloride electrode in the battery itself and that a variety of silver chloride batteries can be made using different electrolytes and negative electrodes.

What I claim is:

1. A primary battery comprising a negative electrode, a positive electrode and an aqueous electrolyte containing chloride ions, said positive electrode comprising a hollow, porous silver substrate with substantially all of the pores of said silver substrate filled with silver chloride active material, chlorine gas filling the interior of said hollow positive electrode, gas input means for supplying chlorine gas into the hollow interior of said positive electrode, said silver chloride active material within the pores of said silver substrate preventing leakage of chlorine gas into the electrolyte and contact with the negative electrode, whereby the potential of said battery is characterized by the potential of silver chloride and said negative electrode in said aqueous electrolyte.

2. A battery in accordance with claim 1 in which the negative electrode is magnesium or zinc.

3. A battery in accordance with claim 1 in which the positive and negative electrodes are cylindrical tubes with the positive electrode placed inside of the negative electrode and spaced therefrom.

4. A battery in accordance with claim 1 in which a separator is used to space the positive electrode from the negative electrode.

5. A primary battery comprising a housing, a negative electrode, a positive electrode and an aqueous electrolyte containing chloride ions, said positive electrode comprising a porous silver substrate with substantially all of the pores of said silver substrate filled with silver chloride active material, said negative electrode located inside of said positive electrode and spaced therefrom, said aqueous electrolyte located in the space between said positive and negative electrodes, chlorine gas filling the space between said positive electrode and said housing, gas input means located in said housing for supplying chlorine gas into the space between said housing and said positive electrode, said silver chloride active material within the pores of said silver substrate preventing leakage of chlorine gas into the electrolyte and contact with the negative electrode, whereby the potential of said battery is characterized by the potential of silver chloride and said negative electrode in said aqueous electrolyte.

6. A batterey in accordance with claim 5 in which the negative electrode is magnesium or zinc.

7. A method of operating the battery of claim 1 comprising discharging the silver chloride positive electrode against the negative electrode in said aqueous electrolyte while simultaneously therewith supplying chlorine gas into the hollow interior of said positive electrode.

8. A method of operating the battery of claim 5 comprising discharging the silver chloride positive electrode against the negative electrode in said aqueous electrolyte while simultaneously therewith supplying chlorine gas into the space between said positive electrode and said housing.

References Cited

UNITED STATES PATENTS

| | | | |
|---|---|---|---|
| 2,275,281 | 3/1942 | Berl | 136—86 |
| 2,572,296 | 10/1951 | Zimmerman et al. | 136—86 |
| 2,590,584 | 3/1952 | Taylor | 136—100 |
| 2,921,110 | 1/1960 | Crowley et al. | 136—86 |
| 3,005,864 | 10/1961 | Sharpe | 136—100 |
| 3,124,487 | 3/1964 | Duddy et al. | 136—136 |
| 3,132,973 | 5/1964 | Duddy et al. | 136—86 |
| 3,343,992 | 9/1967 | Bowers et al. | 136—90 |

WINSTON A. DOUGLAS, Primary Examiner

A. SKAPARS, Assistant Examiner

U.S. Cl. X.R.

136—100